United States Patent
Togawa et al.

(10) Patent No.: US 12,325,463 B2
(45) Date of Patent: Jun. 10, 2025

(54) STEERING DEVICE

(71) Applicant: MAZDA MOTOR CORPORATION, Hiroshima (JP)

(72) Inventors: Yuki Togawa, Hiroshima (JP); Yuki Hori, Hiroshima (JP); Gaku Ikeyama, Hiroshima (JP); Shuji Sanagi, Hiroshima (JP); Toshihiko Mori, Hiroshima (JP); Hiroyuki Fuke, Hiroshima (JP); Nobuyuki Tanaka, Hiroshima (JP); Daito Nakano, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 18/629,991

(22) Filed: Apr. 9, 2024

(65) Prior Publication Data
US 2024/0391515 A1 Nov. 28, 2024

(30) Foreign Application Priority Data

May 23, 2023 (JP) .................................. 2023-084303

(51) Int. Cl.
*B62D 1/184* (2006.01)
*B62D 1/189* (2006.01)

(52) U.S. Cl.
CPC .............. *B62D 1/184* (2013.01); *B62D 1/189* (2013.01)

(58) Field of Classification Search
CPC ................................ B62D 1/184; B62D 1/189
See application file for complete search history.

(56) References Cited

U.S. PATENT DOCUMENTS

| 7,918,483 | B2 * | 4/2011 | Galehr | B62D 1/184 280/775 |
| 8,186,242 | B2 * | 5/2012 | Uesaka | B62D 1/184 280/775 |
| 8,746,740 | B2 * | 6/2014 | Tanaka | B62D 1/184 280/771 |
| 8,899,128 | B2 * | 12/2014 | Maniwa | B62D 1/187 280/775 |

(Continued)

FOREIGN PATENT DOCUMENTS

JP H11-278283 A 10/1999

*Primary Examiner* — Drew J Brown
(74) *Attorney, Agent, or Firm* — Studebaker Brackett PLLC

(57) ABSTRACT

A steering device comprises a tilt-telescopic mechanism to switch between its tilt-and-axial move allowed state and its prohibited state. The tilt-telescopic mechanism comprises a pair of side wall portions provided on both sides, in a vehicle width direction, of an upper column, a bolt penetrating the side wall portions and pressing the side wall portions against each other in an approaching direction, a lever, and a biasing portion arranged between each of the side wall portions and the upper column and operative to apply a pressing force to the upper column from the both sides, in the vehicle width direction, thereof. The biasing portion comprises a pair of upper-side pressing portions to press an upper portion of the upper column above its axial center from both sides and a pair of lower-side pressing portions to press a lower portion of that below its axial center from both sides.

9 Claims, 11 Drawing Sheets

(56) References Cited

U.S. PATENT DOCUMENTS

| | | | |
|---|---|---|---|
| 8,904,901 B2* | 12/2014 | Mashimo | B62D 1/184 |
| | | | 280/775 |
| 9,073,573 B2* | 7/2015 | Sugiura | B62D 1/18 |
| 2015/0107398 A1* | 4/2015 | Nagasawa | B22D 19/16 |
| | | | 74/493 |
| 2019/0031225 A1* | 1/2019 | Kurokawa | B62D 1/184 |

* cited by examiner

STEERING DEVICE

BACKGROUND OF THE INVENTION

The present invention relates to a steering device in which a steering shaft is expandable and tiltable.

Conventionally, various types of steering device for a vehicle in which the expandable and tiltable steering shaft can be fixed at a desired length and angle has been proposed.

The steering device disclosed in Japanese Patent Laid-Open publication No. H11-278283 comprises a cylindrical support column to support the expandable steering shaft, which is comprised of an upper jacket and a lower jacket which are engaged with each other, a support bracket with a pair of side wall portions to support the upper and lower jackets at a vehicle body in a tiltable manner, and a reinforcement bracket arranged between each of the pair of side wall portions and the upper and lower jackets so as to press the upper and lower jackets from both sides, in a vehicle width direction, thereof by a fastening force of a bolt.

The reinforcement bracket is a roughly U-shaped plate member to cover a lower half of the upper and lower jackets and has a pair of pressing portions facing to each other.

In a state where the bolt is fastened, the fastening force of the bolt makes a distance between the pair of pressing portions of the reinforcement narrower, thereby pressing the lower half of the upper and lower jackets engaged with each other toward an inward side from an outward side, in the vehicle width direction, thereof, so that the upper and lower jackets can be fixed at the desired length and angle.

In the above-described steering device, while the pair of pressing portions with the narrowed distance caused by the fastening force of the bolt press the lower half of the upper and lower jackets engaged with each other (support column) toward the inward side from the outward side, in the vehicle width direction, thereof, an upper half of the upper and lower jackets does not receive any pressing force. Accordingly, it is difficult to increase the fastening rigidity in the event of fastening the upper and lower jackets.

Further, since the above-described structure requires that a strong pressing force is applied only to the lower half of the upper and lower jackets and thereby a whole part of the upper and lower jackets is fixed, it may be unavoidable to increase the fastening force of the bolt. Therefore, there is a concern that improperly long time may be required to release the bolt's fastening completely in the event of releasing the bolt's fastening and also in a case where the fastening force of the bolt is not released sufficiently, the tilting and axial moving of the upper and lower jackets may not be conducted smoothly.

SUMMARY OF THE INVENTION

The present invention has been devised in view of the above-described matter, and an object of the present invention is to provide a steering device which can properly fix a steering column supporting a steering shaft at the high fastening rigidity and conduct the tilting and axial moving of a steering column smoothly in the event of releasing the bolt's fastening.

The steering device of the present invention comprises an upper shaft extending in a vehicle longitudinal direction and having a rear end portion to which a steering wheel is fixed, an upper column rotatably supporting the upper shaft, a lower shaft connected to a front end portion of the upper shaft so as to slide in an axial direction, a lower column rotatably supporting the lower shaft and provided to be movable in an axial direction relative to the upper column, a support bracket fixed to a vehicle body and supporting a support-side column which is either one of the lower column and the upper column, and a tilt-telescopic mechanism operative to switch a state of the support-side column between a movable state where the support-side column is allowed to tilt in a vertical direction and move in an axial direction and a prohibited state where the support-side column's tilting and moving is prohibited, wherein the tilt-telescopic mechanism includes a pair of side wall portions provided at the support bracket to interpose the support-side column therebetween from both sides in a vehicle width direction and having tilting long holes extending in the vertical direction, a bolt penetrating the pair of side wall portions through the tilting long holes and producing a fastening force to press the pair of side wall portions against each other in an approaching direction, a bolt operational portion operative to change the fasting force by rotationally operating the bolt, and a biasing member arranged between each of the pair of side wall portions and the support-side column and operative to apply a pressing force to the support-side column from the both sides, in the vehicle width direction, thereof when the pair of side wall portions receive the fastening force, and the biasing member comprises at least a pair of upper-side pressing portions provided to press a portion of the support-side column which is above an axial center of the support-side column from the both sides, in the vehicle width direction, thereof and at least a pair of lower-side pressing portions provided to press another portion of the support-side column which is below the axial center of the support-side column from the both sides, in the vehicle width direction, thereof.

In the above-described steering device, either one of the upper column and the lower column is supported at the support bracket as the support-side column, and the state of the support-side column is switched, by the tilt-telescopic mechanism, between the movable state where the support-side column is allowed to tilt in the vertical direction and move in the axial direction and the prohibited state where the support-side column's tilting and moving is prohibited. The tilt-telescopic mechanism comprises the biasing member which is arranged between each of the pair of side wall portions of the support bracket and the support-side column so as to apply the pressing force to the support-side column from the both sides, in the vehicle width direction, thereof when the pair of side wall portions receive the fastening force.

The above-described biasing member comprises at least the pair of upper-side pressing portions pressing the portion of the support-side column which is above its axial center from the both sides, in the vehicle width direction, thereof and at least the pair of lower-side pressing portions pressing another portion of the support-side column which is below its axial center from the both sides, in the vehicle width direction, thereof.

Accordingly, when the pair of side wall portions of the tilt-telescopic mechanism receive the fastening force of the bolt, since upper-and-lower both sides of the axial center of the support-side column are pressed from the both sides, in the vehicle width direction, thereof by the pair of upper-side pressing portions and the pair of lower-side pressing portion of the biasing member, the support-side column comes to be restrained at four separated points, in a peripheral direction, thereof in its axial-direction view. Consequently, the support-side column can be fixed at the properly-high fastening rigidity between the pair of the side wall portions.

Meanwhile, in the releasing state where the pair of side wall portions do not receive the fastening force, the upper-and-lower both sides of the axial center of the support-side column do not receive any pressing force from the biasing member. Consequently, the vertical tilting and axial moving of the support-side column can be conducted smoothly.

In the above-described steering device, it is preferable that the bolt operational portion be a lever operative to change the fastening force of the bolt inserted into the tilting long holes, this lever comprise a root-side end portion connected to the bolt and an operational-side end portion positioned on a vehicle rearward side of the bolt and operative to receive an operational force from outside, and the pair of upper-side pressing portions and the pair of lower-side pressing portions be arranged on the vehicle rearward side of the tilting long holes.

According to this structure, since the pair of upper-side pressing portions and the pair of lower-side pressing portions of the biasing member are arranged on the vehicle rearward side of a position of the bolt inserted into the tilting long holes, a position of a connection portion where the root-side end portion of the lever (the bolt operational portion) is connected to the bolt can be shifted toward a vehicle forward side from a position of the upper-side pressing portion and the lower-side pressing portion which fix the support-side column. Thereby, the length of the lever can be properly long without changing a longitudinal position of the operational-side end portion of the lever. Accordingly, the fastening force of the bolt can be properly large without increasing the operational force applied to the operational-side end portion. Consequently, the operability of the lever can improve.

In the above-described steering device, it is preferable that the pair of upper-side pressing portions and the pair of lower-side pressing portions be arranged on forward-and-rearward both sides, in the vehicle longitudinal direction, of the tilting long holes, respectively.

According to this structure, the pair of upper-side pressing portions and the pair of lower-side pressing portions of the biasing member are respectively arranged at two separated points, in the longitudinal direction, thereof in such a manner they enclose the tilting long holes formed at the side wall portions in a vehicle-width-direction view. Therefore, the pair of side wall portions can stably fix the support-side column by supporting at the front-and-rear two points of the upper-side pressing portion and the front-and-rear two points of the lower-side pressing portion which enclose the tilting long holes in the vehicle-width-direction view, i.e., at a total of four points of the pressing portions.

In the above-described steering device, it is preferable that the steering device further comprise a pair of pressing plates arranged on respective outward sides, in the vehicle width direction, of the pair of side wall portions and operative to press the pair of side wall portions to respective inward sides, in the vehicle width direction, thereof when receiving the fastening force of the bolt, and the pair of pressing plates have respective convex portions which protrude toward the side wall portions at respective positions which face the pair of upper-side pressing portions and the pair of lower-side pressing portions, interposing the side wall portions therebetween.

According to this structure, when the pressing plates receive the fastening force of the bolt, the convex portions can press the upper-side pressing portions and the lower-side pressing portions of the biasing member via the side wall portions. Thereby, the fastening force of the bolt can be effectively transmitted to the upper-side pressing portions and the lower-side pressing portions of the biasing member. As a result, the support-side column pressed by the pair of upper-side pressing portions and the pair of lower-side pressing portions of the biasing member can be stably fixed between the pair of side wall portions.

In the above-described steering device, it is preferable that the support bracket further comprise a support-bracket connection portion to interconnect the pair of side wall portions, and the support-bracket connection portion have a bending deformation portion operative to be bending-deformed in a direction where the pair of side wall portions approach each other when the pair of side wall portions receive the fastening force of the bolt.

According to this structure, since the support-bracket connection portion interconnecting the pair of side wall portions has the bending deformation portion, the pair of side wall portions can be made close to each other due to bending deformation of the bending-deformation portion when receiving the fastening force of the bolt. Thereby, the fastening force of the bolt can be uniformly transmitted to the pair of upper-side pressing portions and the pair of lower-side pressing portions of the biasing member arranged between the side wall portions and the support-side column. Consequently, the support-side column pressed by the pair of upper-side pressing portions and the pair of lower-side pressing portions of the biasing member can be stably fixed between the pair of side wall portions.

In the above-described steering device, it is preferable that the biasing member further have a pair of support portions extending in the vehicle longitudinal direction and supporting the pair of upper-side pressing portions and the pair of lower-side pressing portions, respectively, and a biasing-member connection portion to interconnect vehicle-forward-side end portions of the pair of support portions, and the pair of support portions be configured to be bending-deformed toward an inward side, in the vehicle width direction, thereof when the pair of upper-side pressing portions and the pair of lower-side pressing portions receive the fastening force of the bolt.

According to this structure, since the pair of support portions supporting the upper-side pressing portions and the lower-side pressing portions, respectively, come to be are bending-deformed toward the inward side, in the vehicle width direction, thereof when the upper-side pressing portions and the lower-side pressing portions receive the fastening force of the bolt, the support-side column pressed by the pair of upper-side pressing portions and the pair of lower-side pressing portions of the biasing member can be stably fixed between the pair of side wall portions.

As described above, the steering device of the present invention can properly fix the column to support the shaft at the high fastening rigidity and conduct the tilting and axial moving of the column smoothly in the event of releasing the bolt's fastening.

The present invention will become apparent from the following description which refers to the accompanying drawings.

DETAILED DESCRIPTION OF THE INVENTION

Figure 1:
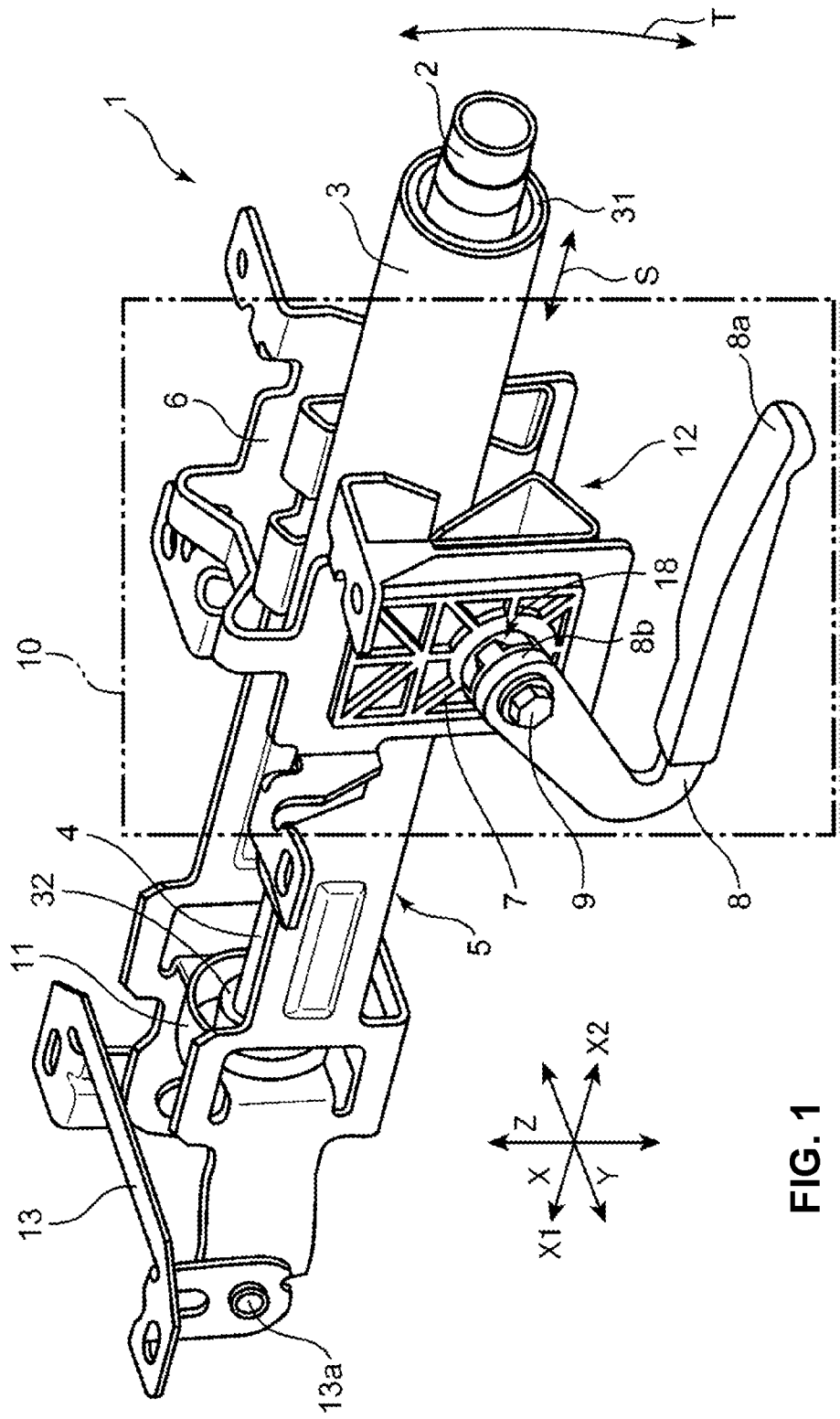
FIG. 1 is a perspective view showing an entire structure of a steering device according to an embodiment of the present invention.
Figure 2:
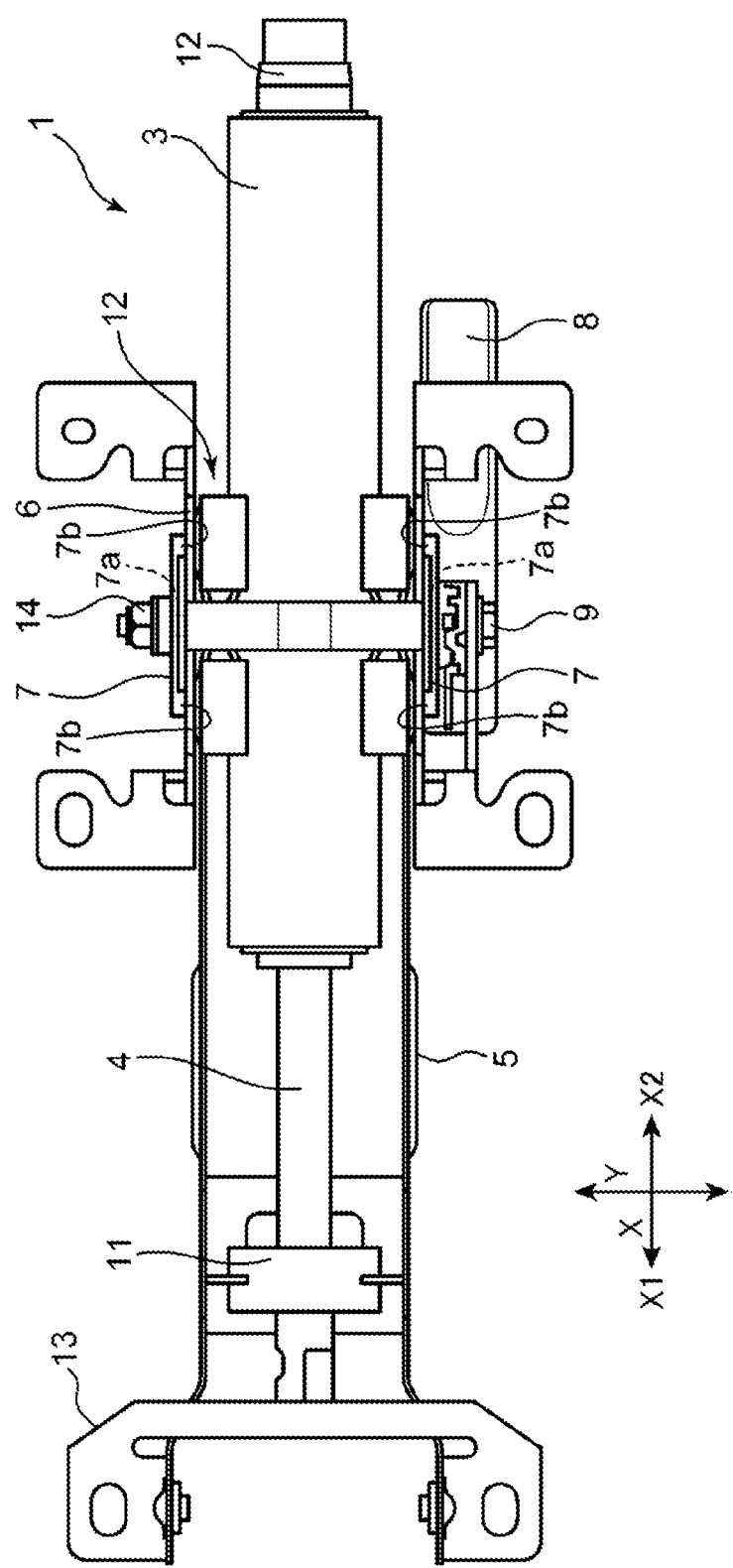
FIG. 2 is a plan view of the steering device shown in FIG. 1.

Hereafter, a steering device according to an embodiment of the present invention will be described specifically referring to the drawings.

A steering device 1 of the present embodiment shown in FIGS. 1-6 is arranged along a vehicle longitudinal direction X in such a manner that it protrudes toward a cabin inside from an engine room provided in a vehicle body of an automotive vehicle, which is used as the steering device of a vehicle.

This steering device 1 is configured such that a steering shaft composed of an upper shaft 2 and a lower shaft 4 is configured to be expandable and tiltable and also be fixable at the desired length and angle.

Specifically, the steering device 1 comprises the upper shaft 2, an upper column 3 which rotatably supports the upper shaft 2, the lower shaft 4 which is connected to a front end portion (an end portion at a vehicle forward side X1) of the upper shaft 2 so as to slide in an axial direction, a lower column portion 11 (lower column) which rotatably supports the lower shaft 4 and includes an upper-column biasing portion 12 (biasing member), a support bracket 6 which supports the upper column 3, a pair of pressing plates 7 which are arranged on both sides, in a vehicle width direction Y, of the support bracket 6, a bolt 9 and a nut 14 which are together operative to fasten the support bracket 6 and the pair of pressing plates 7 from respective outward sides, in the vehicle width direction Y, thereof, a lever 8 as a bolt operational portion which is connected to a head-side portion of the bolt 9 and operative to change a fastening force of the bolt 9 by rotating the bolt 9, and an outer-column support bracket 13 which supports so that the outer column 5 can tilt in a vertical direction Z. Herein, since the nut 14 is fixed at an outer face of the pressing plate 7 without rotation, the bolt 9 can be fastened or released by a driver's operation of the lever 8. Further, the lever 8 is specifically configured such that a cam 18 attached to the bolt 9 is rotatably operated so as to ride on or down, thereby changing a state where the fastening force of bolt 9 is generated or not.

The support bracket 6 and the outer-column support bracket 13 are fixed at the vehicle body by bolts or the like. By weakening the fastening force of the bolt 9 by an operation of the lever 8, the upper shaft 2, the upper column 3, the lower shaft 4, the outer column 5, and the pair of pressing plates 7 are made tiltable in the vertical direction Z around a support axis 13a of the outer-column support bracket 13 (see a tilt direction T shown in FIG. 1). At the same time, the upper shaft 2 and the upper column 3 are made slidable in the vehicle longitudinal direction X relative to the lower shaft 4 and the outer column 5 (see a slide direction S shown in FIG. 1). After the upper shaft 2 is moved to the angle and longitudinal position, in the longitudinal direction X, desired by an operator, the fastening operation of the bolt 9 can easily make the steering device 1 return to its fixing state.

Hereafter, each component of the steering device 1 will be described.

The upper shaft 2 is a bar-shaped member extending in the vehicle longitudinal direction X, and a steering wheel (not illustrated) is fixed to its rear end portion (an end portion at a vehicle rearward side X2).

The upper column 3 is a cylindrical member rotatably supporting the upper shaft 2. The upper column 3 includes plural bearings 31 (see FIGS. 1, 5-6, and 12) which support front-and-rear end portions of the upper shaft 2.

Figure 4:
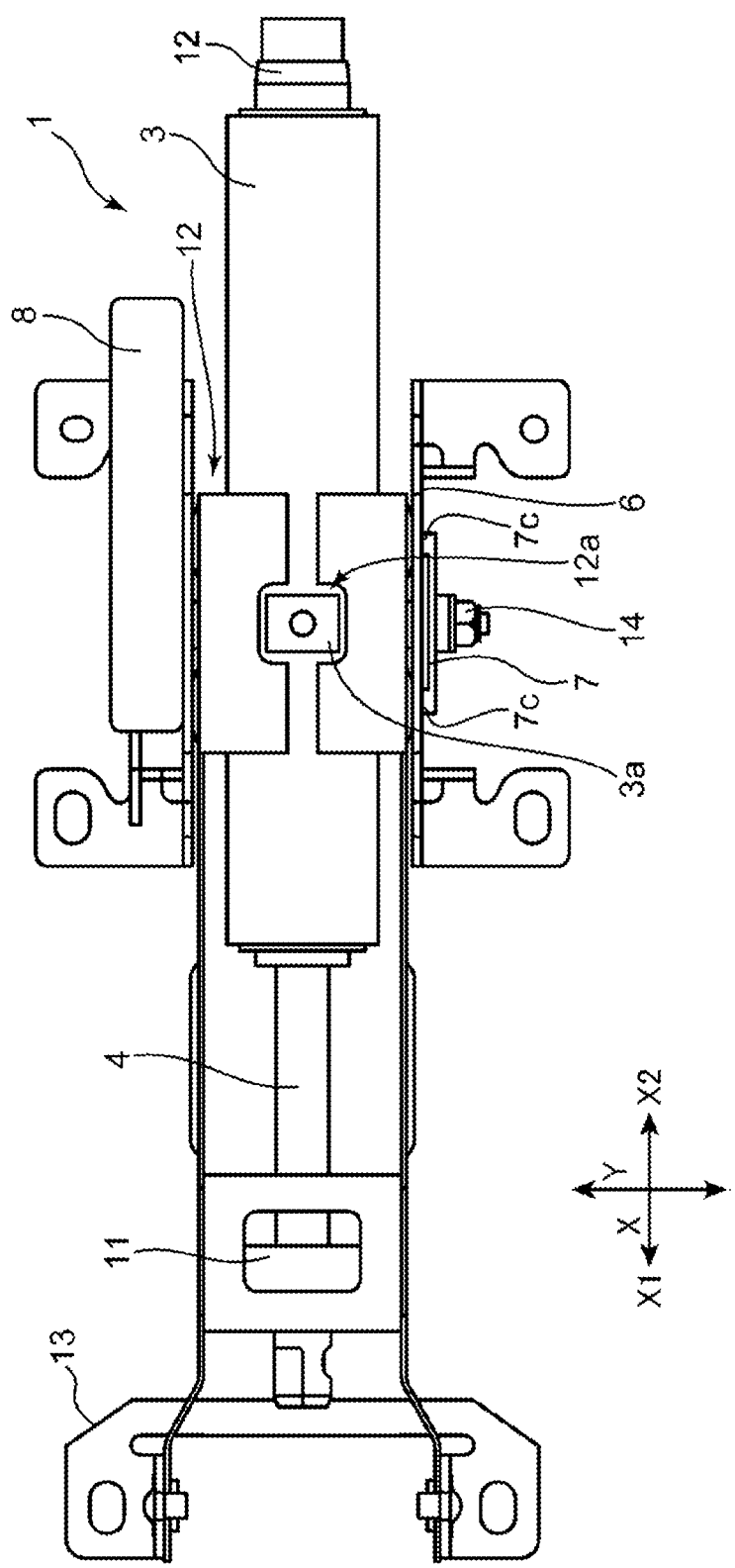
FIG. 4 is a bottom view of the steering device shown in FIG. 1.
Figure 5:
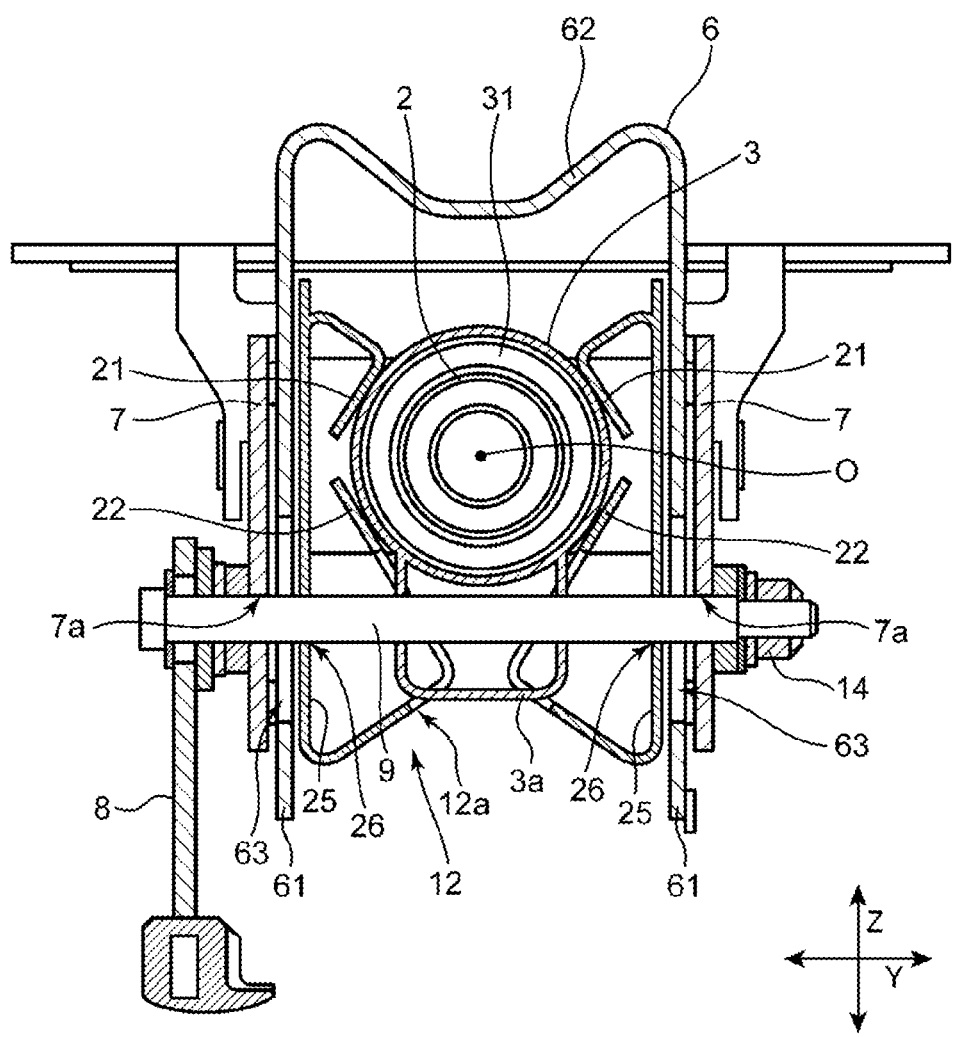
FIG. 5 is a sectional view taken along line V-V of FIG. 3.

In the present embodiment, as shown in FIGS. 4 and 5, a rectangular protrusion portion 3a which protrudes downward is formed in a certain area of a lower-side portion of the upper column 3 which overlaps, in the vehicle longitudinal direction X, the upper-column biasing portion 12. The bolt 9 penetrates this rectangular protrusion portion 3a in the vehicle width direction Y. Further, the rectangular protrusion portion 3a is exposed to a downward side through a rectangular opening 12a of the upper-column biasing portion 12. Herein, since the rectangular opening 12a has a wider width, in the longitudinal direction, X than the rectangular protrusion portion 3a, the upper-column biasing portion 12 does not prevent a move, in the longitudinal direction X, of the upper column 3.

The lower shaft 4 is a bar-shaped member which is connected to the front end portion (the end portion at the vehicle forward side X1) of the upper shaft 2 so as to slide in the axial direction. More specifically, the lower shaft 4 has a telescopic structure (see FIG. 12) in which the lower shaft 4 is slidable in the axial direction relative to the upper shaft 2, and the lower shaft 4 is coupled to the upper shaft 2 (e.g., via a spline coupling) in such a manner that it can rotate together with the upper shaft 2.

Figure 7:
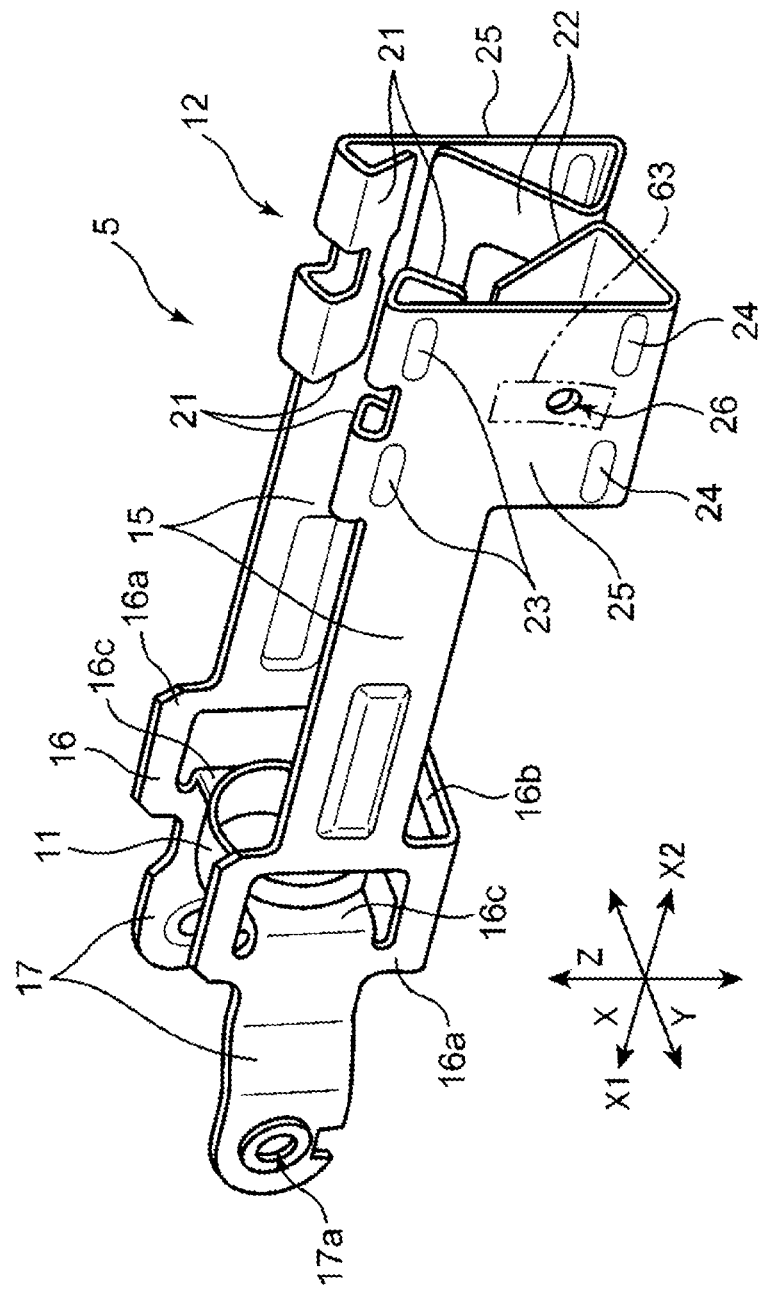
FIG. 7 is a perspective view of an outer column shown in FIG. 1.
Figure 8:
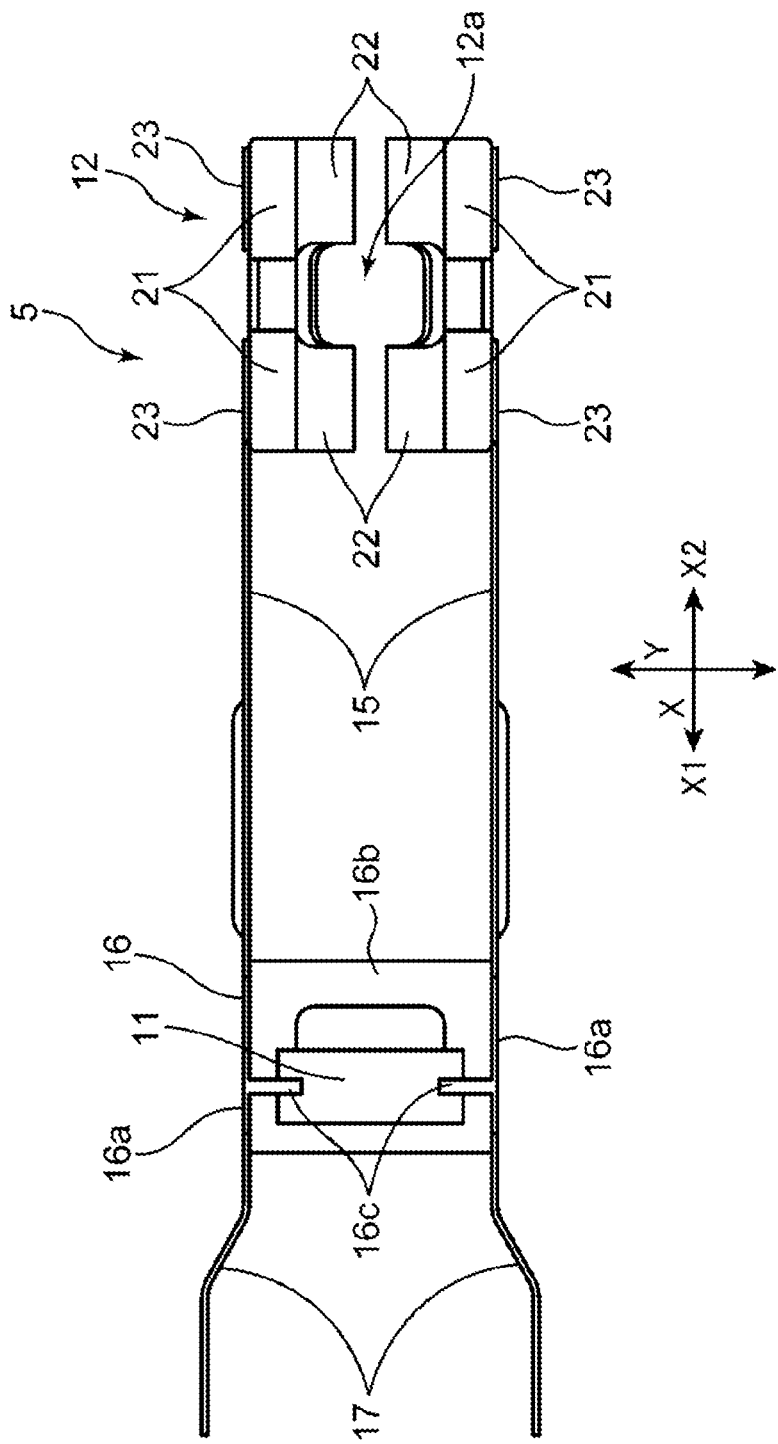
FIG. 8 is a bottom view of the outer column shown in FIG. 1.
Figure 9:
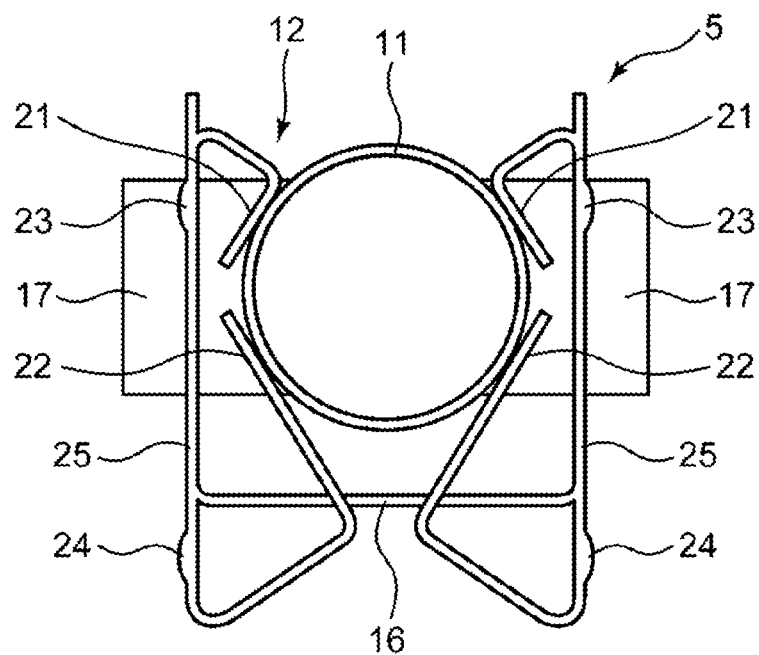
FIG. 9 is a view of the outer column shown in FIG. 7, when viewed from a vehicle rearward side.

As shown in FIGS. 7-9, the outer column 5 is a member which includes the lower column portion 11 (lower column) which rotatably supports the lower shaft 4 and the upper-column biasing portion 12 (biasing member). In other words, the outer column 5 of the present embodiment is constituted by the lower column portion 11 (lower column) and the upper-column biasing portion 12 (biasing member) which are integrated.

The lower column portion 11 is a portion which is movable in the axial direction (vehicle longitudinal direction X) relative to the upper column 3 as well as rotatably supports the lower shaft 4. In the present embodiment, a whole part of the outer column 5 including the lower column portion 11 is movable in the axial direction (vehicle longitudinal direction X) relative to the upper column 3 as well.

The lower column portion 11 has a bearing 32 (see FIG. 1) which rotatably supports an end portion at the vehicle forward side X1 of the lower shaft 4 inside its cylindrical body.

The upper-column biasing portion 12 is the biasing member which is arranged between a pair of side wall portions 61

(described later) (see FIGS. 3, 5, 6, 10 and 11) of the support bracket 6 and the upper column 3 and also operative to apply a pressing force to the upper column 3 toward its axial center O from the both sides, in the vehicle width direction Y, thereof when the pair of side wall portions 61 receive the fastening force of the bolt 9.

As shown in FIGS. 6-9, the upper-column biasing portion 12 comprises at least a pair (front-and-rear two pairs in the present embodiment) of upper-side pressing portions 21 which are provided to press a portion of the upper column 3 which is above the axial center O of the upper column 3 toward the axial center O from the both sides, in the vehicle width direction Y, thereof, at least a pair (front-and-rear two pairs in the present embodiment) of lower-side pressing portions 22 which is provided to press another portion of the upper column 3 which is below the axial center O toward the axial center O from the both sides, in the vehicle width direction Y, thereof, and a pair of side wall portions 25 which support the pair of upper-side pressing portions 21 and the pair of lower-side pressing portions 22 on the both sides, respectively.

Each of the side wall portions 25 has a bolt insertion hole 26 for insertion of the bolt 9 at a position overlapping a tilting long hole 63 (described later) (see FIGS. 7, 10 and 11) which is formed at the side wall portion 61 of the support bracket 6.

In the present embodiment, the pair of upper-side pressing portions 21 and the pair of lower-side pressing portions 22 are positioned at least on the vehicle rearward side X2 of the tilting long holes 63.

More specifically, the pair of upper-side pressing portions 21 and the pair of lower-side pressing portions 22 of the present embodiment are arranged on the forward-and-rearward both sides, in the vehicle longitudinal direction X, of the tilting long holes 63, respectively.

The upper-side pressing portion 21 and the lower-side pressing portion 22 are arranged on the inward side, in the vehicle width direction Y, of the side wall portion 25 (on a facing side of the pair of side wall portions 25). In the present embodiment, the upper-side pressing portion 21 and the lower-side pressing portion 22 are integrally formed with the side wall portion 25, which are specifically formed by a plate-shaped portion which is configured to bend inwardly, in the vehicle width direction Y, from upper-and-lower both end portions of the side wall portion 25.

At an outward face, in the vehicle width direction Y, of each of the side wall portions 25 are formed an upper-side convex portion 23 and a lower-side convex portion 24 which respectively protrude outwardly, in the vehicle width direction Y, from the above-described outward face at respective positions corresponding to the upper-side pressing portion 21 and the lower-side pressing portion 22.

In the present embodiment, the upper-column biasing portion 12 further comprises a pair of support portions 15 which extend toward the vehicle forward side X1, in the vehicle longitudinal direction X, from respective front end portions of the pair side wall portions 25 (from respective end portions at the vehicle forward side X1) and a connection portion 16 (corresponding to a "biasing-member connection portion" in the claims) to interconnect respective end portions at the vehicle forward side X1 of the pair of support portions 15.

The pair of support portions 15 respectively support the upper-side pressing portions 21 and the lower-side pressing portions 22 via the pair of side wall portions 25. The pair of support portions 15 are configured to be bending-deformed toward the inward side, in the vehicle width direction Y, thereof when the pair of upper-side pressing portions 21 and the pair of lower-side pressing portions 22 receive the fastening force of the bolt 9. Specifically, as shown in FIG. 7, the support portion 15 is a plate-shaped portion which is bendable in the vehicle width direction Y, and its end portion at the vehicle forward side X1 is fixed to the connection portion 16, thereby forming a cantilever-beam state. An end portion at the vehicle rearward side X2 of the support portion 15 is connected to the upper-side pressing portion 21 and the lower-side pressing portion 22. When the fastening force of the bolt 9 inserted into the bolt insertion holes 26 is applied to the pair of side wall portions 25, this force is transmitted to the upper-side pressing portions 21 and the lower-side pressing portions 22, so that the pair of plate-shaped support portions 15 are bending-deformed inwardly, in the vehicle width direction, thereof.

The connection portion 16 of the present embodiment further comprises a pair of side wall portions 16a which are arranged on the both sides, in the vehicle width direction Y, of the lower column portion 11 and connected to the respective end portions at the vehicle forward side X1 of the pair of support portions 15 and a bottom-wall portion 16b which extends in the vehicle width direction Y below the lower column portion 11 and interconnects respective lower ends of the pair of side wall portions 16a. The connection portion 16 further comprises a pair of column connection portions 16c which respectively interconnect the pair of side wall portions 16a and the lower column portion 11.

Figure 3:
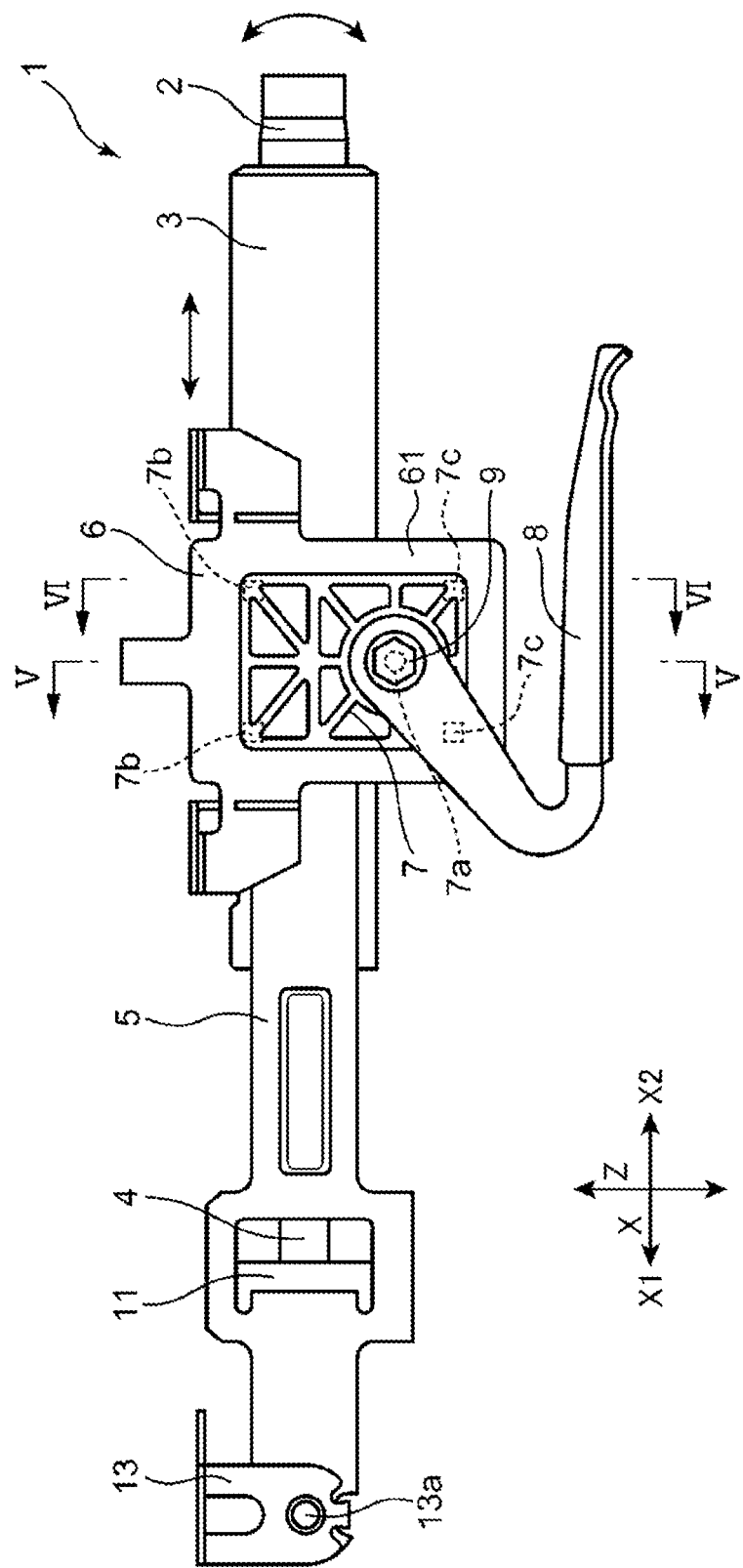
FIG. 3 is an elevational view of the steering device shown in FIG. 1.

The outer column 5 of the present embodiment includes a pair of plate-shaped arm portions 17 which extend toward the vehicle forward side X1 further from the respective front end portions of the pair of side wall portions 16a of the connection portion 16. An axial hole 17a is formed at each end portion at the vehicle forward side X1 of the pair of arm portions 17. A support axis 13a of the outer-column support bracket 13 shown in FIGS. 1 and 3 is rotatably supported at the axial hole 17a. Thereby, the outer column 5 is supported at the outer-column support bracket 13 so as to tilt in the vertical direction Z around the support axis 13a (see the tilt direction T in FIG. 1).

The support bracket 6 is a member which is fixed to the vehicle body and supports a support-side column which is either one of the lower column portion 11 and the upper column 3, specifically the upper column 3 in the present embodiment.

Figure 10:
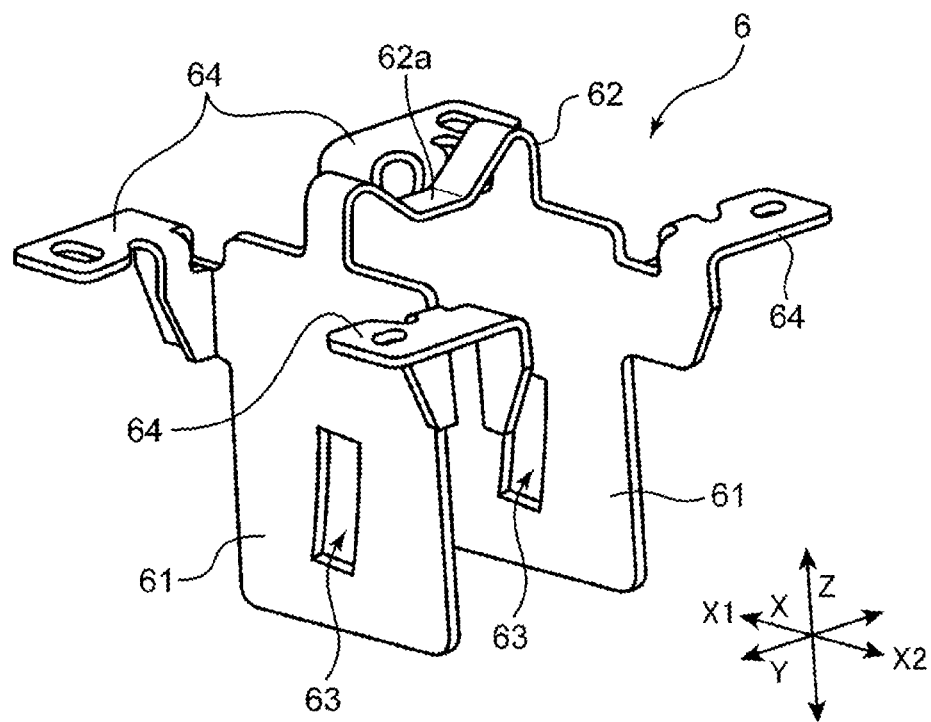
FIG. 10 is a perspective view of a support bracket shown in FIG. 1.
Figure 11:
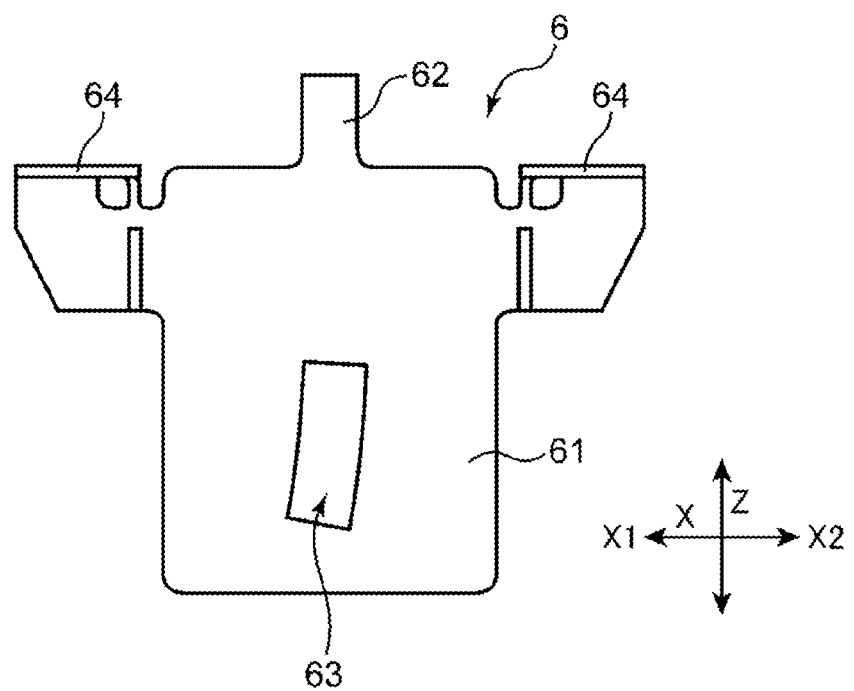
FIG. 11 is an elevational view of the support bracket shown in FIG. 10.

Specifically, the support bracket 6 comprises, as shown in FIGS. 10 and 11, the pair of side wall portions 61 which are provided to interpose the upper column 3 from the both sides, in the vehicle width direction Y, thereof and where the tilting long holes 63 extending in the vertical direction Z are formed, a connection portion 62 (corresponding to a "support-bracket connection portion" in the claims) which interconnects the pair of side wall portions 61, and plural (four, in the present embodiment shown in FIG. 10) vehicle-body connection portions 64 which are connected to the vehicle body.

The connection portion 62 has a bending deformation portion 62a which is operative to be bending-deformed in a direction where respective upper portions of the pair of side wall portions 61 approach each other when the pair of side wall portions 61 receive the fastening force of the bolt 9. The bending deformation portion 62a shown in FIG. 10 is a portion which is formed by downward bending a middle part, in the vehicle width direction Y, of the plate-shaped connection portion 62 extending in the vehicle width direction Y so that the connection portion 62 can bend easily. That is, the connection portion 62 with the bending deformation portion 62a shown in FIG. 10 is of a M-letter shape when viewed along the vehicle longitudinal direction X. Thus, since the bending deformation portion 62a is deformed when the pair of side wall portions 61 receive the fastening force of the bolt 9, the connection portion 62 with the bending deformation portion 62a can be easily deformed in the direction where the respective upper portions of the pair of side wall portions 61 approach each other.

As shown in FIGS. 1-6, the pair of pressing plates 7 are respectively arranged on the outward side, in the vehicle width direction Y, of the pair of side wall portions 61 of the support bracket 6. The pair of pressing plates 7 press the pair of side wall portions 61 inwardly, in the vehicle width direction Y, thereof when receiving the fastening force of the bolt 9.

Each of the pair of pressing plates 7 has an insertion hole 7a where the bolt 9 is inserted. Further, the pair of pressing plates 7 have at least a single upper-side convex portion 7b and at least a single lower-side convex portion 7c which protrude toward the side wall portions 61 at respective positions which face the pair of upper-side pressing portions 21 and the pair of lower-side pressing portions 22, interposing the side wall portions 61 therebetween. In the present embodiment, as shown in FIG. 3, the upper-side convex portions 7b and the lower-side convex portions 7a are arranged on the forward-and-rearward both sides of the insertion holes 7a.

As shown in FIG. 5, the bolt 9 penetrates, from the left side, through the insertion holes 7a of the pair of pressing plates 7, the tilting long holes 63 of the pair of side wall portions 61 of the support bracket 6, the bolt insertion holes 26 of the pair of side wall portions 25 of the upper-column biasing portion 12, and also penetrates the protrusion portion 3a of the upper column 3. Thus, the pair of pressing plates 7, the support bracket 6, the upper-column biasing portion 12, and the upper column 3 can be connected by the single bolt 9.

As shown in FIG. 1, the lever 8 comprises a root-side end portion 8b which is connected to the bolt 9 and an operational-side end portion 8a which is positioned on the vehicle rearward side X2 of the bolt 9 and operative to receive an operational force from outside. By applying the operational force to the operational-side end portion 8a of the lever 8 in the vertical direction Z, the fastening force can be applied to the bolt 9 which is connected to the root-side end portion 8b and inserted into the tilting long holes 63 or the bolt 9 can be loosened.

Features of Present Embodiment (1)

The above-described steering device 1 of the present embodiment comprises the tilt-telescopic mechanism operative 10 to switch the state of the support-side column between the movable state where the upper column 3 is allowed to tilt in the vertical direction Z and move in the axial direction (vehicle longitudinal direction X) and the prohibited state where the upper column's tilting and moving is prohibited. Specifically, the tilt-telescopic mechanism 10 includes the pair of side wall portions 61 provided at the support bracket 6, the bolt 9 penetrating the pair of side wall portions 61 through the tilting long holes 63 and producing the fastening force to press the pair of side wall portions 61 against each other in the approaching direction, the lever 8 operative to change the fasting force by rotationally operating the bolt 9, and the upper-column biasing portion 12 (biasing member) arranged between each of the pair of side wall portions 61 and the upper column 3 and operative to apply the pressing force to the upper column 3 toward its axial center O from the both sides, in the vehicle width direction Y, thereof when the pair of side wall portions 61 receive the fastening force.

By applying the operational force to the operational-side end portion 8a of the lever 8 in the vertical direction Z, the fastening force of the bolt 9 can be increased or decreased. Thus, the function of the tilt-telescopic mechanism 10, that is-switching the state of the upper column 3 between the movable state and the prohibited state can be performed.

Figure 6:
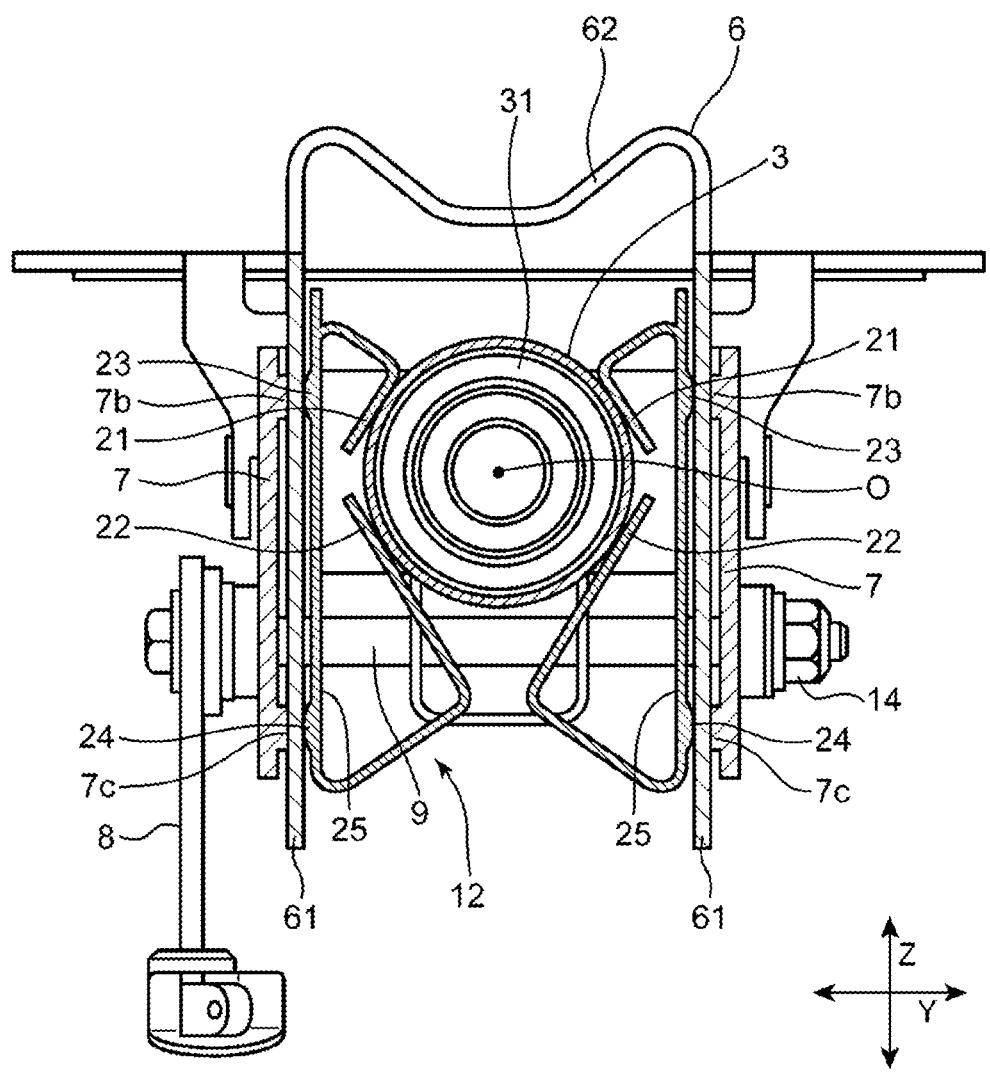
FIG. 6 is a sectional view taken along line VI-VI of FIG. 3.

As shown in FIGS. 6 and 7, the upper-column biasing portion 12 comprises at least the pair (front-and-rear two pairs in the present embodiment) of upper-side pressing portions 21 pressing the portion of the upper column 3 which is above its axial center O from the both sides, in the vehicle width direction Y, thereof and at least the pair (front-and-rear two pairs in the present embodiment) of lower-side pressing portions 22 pressing the other portion of the upper column 3 which is below its axial center O from the both sides, in the vehicle width direction Y, thereof.

Accordingly, when the pair of side wall portions 61 receive the fastening force of the bolt 9, since the upper-and-lower both sides of the axial center O of the upper column 3 are pressed from the both sides, in the vehicle width direction Y, thereof by the pair of upper-side pressing portions 21 and the pair of lower-side pressing portion 22 of the upper-column biasing portion 12, the upper column 3 comes to be restrained at four separated points, in a peripheral direction, thereof in its axial-direction (vehicle longitudinal direction X) view. Consequently, the upper column 3 can be fixed at the high fastening rigidity between the pair of the side wall portions 61.

Meanwhile, in the releasing state where the pair of side wall portions 61 do not receive the fastening force, the upper-and-lower both sides of the axial center O of the upper column 3 do not receive any pressing force from the upper-column biasing portion 12. Consequently, the vertical tilting and axial moving of the upper column 3 can be conducted smoothly.

(2)

In the steering device 1 of the present embodiment, the bolt operational portion is the lever 8 operative to change the fastening force of the bolt 9 inserted into the tilting long holes 63. As shown in FIG. 1, the lever 8 comprises the root-side end portion 8b connected to the bolt 9 and the operational-side end portion 8a positioned on the vehicle rearward side X2 of the bolt 9 and operative to receive the operational force from outside. The pair of upper-side pressing portions 21 and the pair of lower-side pressing portions 22 are arranged on the vehicle rearward side X2 of the tilting long holes 63 at least (in the present embodiment, the pair of upper-side pressing portions 21 and the pair of lower-side pressing portions 22 are arranged on the forward-and-rearward both sides of the tilting long holes 63).

According to this structure, the pair of upper-side pressing portions 21 and the pair of lower-side pressing portions 22 of the upper-column biasing portion 12 are arranged on the vehicle rearward side X2 of the position of the bolt 9 inserted into the tilting long holes 63. Therefore, the position of the connection portion where the root-side end portion 8b of the lever 8 is connected to the bolt 9 can be shifted toward the vehicle forward side X1 from the position of the upper-side pressing portion 21 and the lower-side pressing portion 22 which fix the upper column 3. Thereby, the length of the lever 8 can be properly long without changing the position, in the vehicle longitudinal direction X, of the operational-side end portion 8*a* of the lever 8. Accordingly, the fastening force of the bolt 9 can be properly large without increasing the operational force applied to the operational-side end portion 8*a*. Consequently, the operability of the lever 8 can improve.

Figure 12:
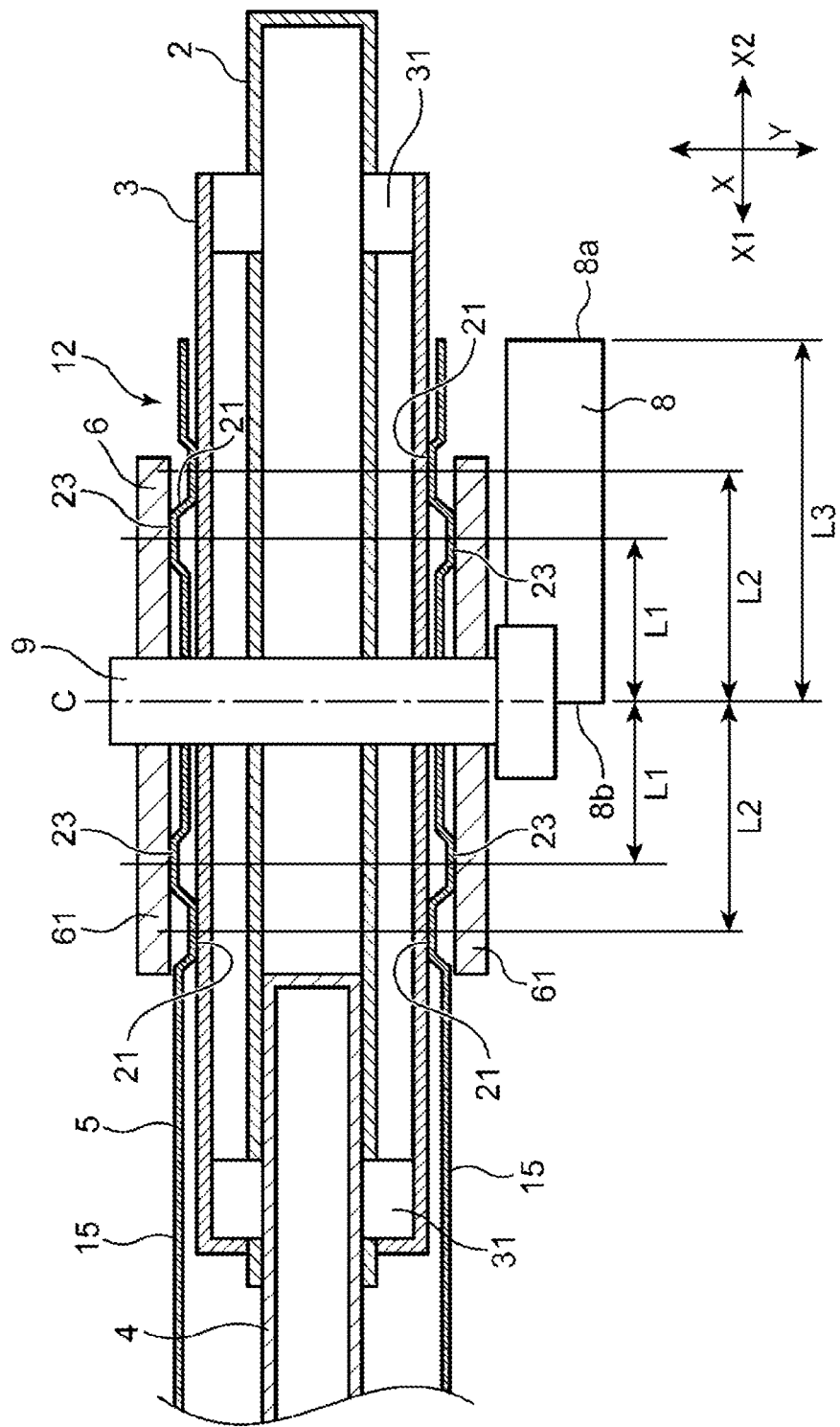
FIG. 12 is an explanatory diagram showing a positional-relationship state where upper pressing portions of an upper-column biasing portion are arranged on forward-and-rearward both sides of a bolt and an operational-side end portion of a lever is arranged on a vehicle rearward side of the upper pressing portions.

For example, positional relationships of the lever 8, the bolt 9, and the front-and-rear pressing portions 21 may be considered with a use of a simplified model shown in FIG. 12. A portion where the upper-column biasing portion 12 receives the fastening force of the bolt 9 is the upper-side convex portion 23 which contacts the side wall portion 61 of the support bracket 6. Herein, in a case where an axial center C of the bolt 9 is considered as a standard position, the length from the upper-side convex portion 23 to the axial center C of the bolt 9 is defined as L1. Next, a portion where the upper-column biasing portion 12 applies the fastening force to the upper column 3 is the upper-side pressing portion 21. Herein, the length from the upper-side pressing portion 21 to the axial center C of the bolt 9 is defined as L2. Meanwhile, a portion which receives the operational force from the outside for applying the fastening force to the bolt 9 is the operational-side end portion 8*a* of the lever 8. The length from the operational-side end portion 8*a* to the axial center C of the bolt 9 is defined as L3.

As shown in FIG. 12, the right-side upper-side pressing portion 21 which is positioned on the right side is arranged on the vehicle rearward side X2 (right side) of the position of the bolt 9. According to the positional relationships shown in FIG. 12, the length L3 between the operational-side end portion 8*a* and the axial center C can be set to be longer than the length L1 between the upper-side convex portion 23 and the axial center C or the length L2 between the upper-side pressing portion 21 and the axial center C. Therefore, the connection portion where the root-side end portion 8*b* of the lever 8 and the bolt 9 are connected can be shifted toward the vehicle forward side X1 from the above-described right-side upper-side pressing portion 21 which fixes the upper column 3. Accordingly, the length of the lever 8 can be made properly long without changing the position, in the vehicle longitudinal direction X, of the operational-side end portion 8*a* of the lever 8.

(3)

In the steering device 1 of the present embodiment, as shown in FIG. 7, the pair of upper-side pressing portions 21 and the pair of lower-side pressing portions 22 are arranged on the forward-and-rearward both sides, in the vehicle longitudinal direction X, of the tilting long holes 63, respectively.

According to this structure, the pair of upper-side pressing portions 21 and the pair of lower-side pressing portions 22 of the upper-column biasing portion 12 are respectively arranged at the two separated points, in the longitudinal direction X, thereof in such a manner they enclose the tilting long holes 63 formed at the side wall portions 61 in the view of the vehicle width direction Y. Therefore, the pair of side wall portions 61 can stably fix the upper column 3 by supporting at the front-and-rear two points of the upper-side pressing portion 21 and the front-and-rear two points of the lower-side pressing portion 22 which enclose the tilting long holes 63 in the vehicle-width-direction view (in the view of the vehicle width direction Y), i.e., at a total of four points of the pressing portions.

(4)

The steering device 1 of the present embodiment further comprises, as shown in FIGS. 1-6, the pair of pressing plates 7 arranged on the respective outward sides, in the vehicle width direction Y, of the pair of side wall portions 61 and operative to press the pair of side wall portions 61 to the respective inward sides, in the vehicle width direction Y, thereof when receiving the fastening force of the bolt 9. This pair of pressing plates 7 respectively have the upper-side convex portions 7*b* and the lower-side convex portions 7*c* which protrude toward the side wall portions 61 at the respective positions which face the pair of upper-side pressing portions 21 and the pair of lower-side pressing portions 22, interposing the side wall portions 61 therebetween.

According to this structure, when the pressing plates 7 receive the fastening force of the bolt 9, the upper-side convex portions 7*b* and the lower-side convex portions 7*c* can press the upper-side pressing portions 21 and the lower-side pressing portions 22 of the upper-column biasing portion 12 via the side wall portions 61. Thereby, the fastening force of the bolt 9 can be effectively transmitted to the upper-side pressing portions 21 and the lower-side pressing portions 22 of the upper-column biasing portion 12. As a result, the upper column 3 pressed by the pair of upper-side pressing portions 21 and the pair of lower-side pressing portions 22 of the upper-column biasing portion 12 can be stably fixed between the pair of side wall portions 61.

(5)

Further, in the present embodiment, at the outward (back side) face, in the vehicle width direction Y, of each of the side wall portions 25 of the upper-column biasing portion 12 are formed the upper-side convex portion 23 and the lower-side convex portion 24 which respectively protrude outwardly, in the vehicle width direction Y, from the above-described outward face at the respective positions corresponding to the upper-side pressing portion 21 and the lower-side pressing portion 22. Accordingly, when the pressing plates 7 receive the fastening force of the bolt 9, the upper-side convex portions 7*b* and the lower-side convex portions 7*c* of the pressing plates 7 respectively press the upper-side convex portions 23 and the lower-side convex portions 24 which protrude outwardly, in the vehicle direction, of the upper-column biasing portion 12 in a pin-point manner, so that the pressing force can be effectively transmitted from the upper-side convex portions 23 and the lower-side convex portions 24 to the upper-side pressing portions 21 and the lower-side pressing portions 22 which are positioned on the inward sides, in the vehicle width direction, of these portions 23, 24. Therefore, the upper-side pressing portions 21 and the lower-side pressing portions 22 of the upper-column biasing portion 12 can properly fix the upper column 3, effectively pressing that, even if the operational force applied of the lever 8 is not so strong.

(6)

In the steering device 1 of the present embodiment, the support bracket 6 further comprises the connection portion 62 to interconnect the pair of side wall portions 61. This connection portion 62 has the bending deformation portion 62*a* operative to be bending-deformed in the direction where the pair of side wall portions 61 approach each other when the pair of side wall portions 61 receive the fastening force of the bolt 9.

According to this structure, since the connection portion 62 interconnecting the pair of side wall portions 61 has the bending deformation portion 62*a*, the pair of side wall portions 61 can be made close to each other due to bending deformation of the bending-deformation portion 62*a* when receiving the fastening force of the bolt 9. Thereby, the fastening force of the bolt 9 can be uniformly transmitted to the pair of upper-side pressing portions 21 and the pair of lower-side pressing portions 22 of the upper-column biasing portion 12 arranged between the side wall portions 61 and the upper column 3. Consequently, the upper column 3 pressed by the pair of upper-side pressing portions 21 and the pair of lower-side pressing portions 22 of the upper-column biasing portion 12 can be stably fixed between the pair of side wall portions 61.

(7)

In the steering device 1 of the present embodiment, the upper-column biasing portion 12 further has the pair of support portions 15 extending in the vehicle longitudinal direction X and supporting the pair of upper-side pressing portions 21 and the pair of lower-side pressing portions 22, respectively, and the connection portion 16 to interconnect the respective end portions at the vehicle forward side X1 of the pair of support portions 15. The pair of support portions 15 are configured to be bending-deformed toward the inward side, in the vehicle width direction Y, thereof when the pair of upper-side pressing portions 21 and the pair of lower-side pressing portions 22 receive the fastening force of the bolt 9 (for example, the support portion 15 is made of a M-letter shaped plate member deformable in the vehicle width direction Y). According to this structure, since the pair of support portions 15 supporting the upper-side pressing portions 21 and the lower-side pressing portions 22, respectively, come to be bending-deformed toward the inward side, in the vehicle width direction Y, thereof when these portions 21, 22 receive the fastening force of the bolt 9, the upper column 3 pressed by the pair of upper-side pressing portions 21 and the pair of lower-side pressing portions 22 of the upper-column biasing portion 12 can be stably fixed between the pair of side wall portions 61.

Modified Examples (A)

While the above-described embodiment is configured such that the upper-column biasing portion 12 which press the lower column portion 11 rotatably supporting the lower shaft 4 and the upper column 3 is included in the outer column 5, the present invention is not limited to this. The lower column portion 11 and the upper-column biasing portion 12 may be made as separated independent parts. That is, the lower column portion 11 may be a cylindrical-shaped unit member, and the upper-column biasing portion 12 may be another unit member which comprises at least the pair of upper-side pressing portions 21 and the lower-side pressing portions 22.

(B)

The steering device 1 of the above-described embodiment has the supporting structure of the upper column 3, in which the support bracket 6 supports the upper column 3 and the upper-column biasing portion 12 comprises at least the pair of upper-side pressing portions 21 pressing the portion of the upper column 3 which is above the axial center O of the upper column 3 from the both sides, in the vehicle width direction Y, thereof and the pair of lower-side pressing portions 22 pressing the other portion of the upper column 3 which is below the axial center O from the both sides, in the vehicle width direction Y, thereof. However, the present invention is not limited to this supporting structure.

The present invention can be achieved as long as the support bracket supports the support-side column which is either one of the lower column and the upper column and the biasing member comprises at least a pair of upper-side pressing portions provided to press a portion of the support-side column which is above the axial center of the support-side column from the both sides, in the vehicle width direction, thereof and at least a pair of lower-side pressing portions provided to press another portion of the support-side column which is below the axial center of the support-side column from the both sides, in the vehicle width direction, thereof.

Therefore, a structure in which the support bracket supports the lower column and at least the pair of upper-side pressing portions and at least the pair of lower-side pressing portions press the upper-side portions and the lower-side portions of the lower column toward its axial center can be included in the scope of the present invention as well.

(C)

While the lever 8 is exemplified as the bolt operational portion operative to change the fastening force of the bolt 9 through its rotational operation in the above-described embodiment, the present invention is not limited to this. Any portion can be included in the bolt operational portion of the present invention as long as it is capable of changing the fastening force of the bolt by rotating the bolt 9. For example, an electromotive actuator to rotatably operate a bolt is applicable as well.

What is claimed is:

1. A steering device, comprising:
an upper shaft extending in a vehicle longitudinal direction and having a rear end portion to which a steering wheel is fixed;
an upper column rotatably supporting the upper shaft;
a lower shaft connected to a front end portion of the upper shaft so as to slide in an axial direction;
a lower column rotatably supporting the lower shaft and provided to be movable in an axial direction relative to the upper column;
a support bracket fixed to a vehicle body and supporting a support-side column which is either one of the lower column and the upper column; and
a tilt-telescopic mechanism operative to switch a state of the support-side column between a movable state where the support-side column is allowed to tilt in a vertical direction and move in an axial direction and a prohibited state where the support-side column's tilting and moving is prohibited,
wherein said tilt-telescopic mechanism includes a pair of side wall portions provided at said support bracket to interpose said support-side column therebetween from both sides in a vehicle width direction and having tilting long holes extending in the vertical direction, a bolt penetrating the pair of side wall portions through the tilting long holes and producing a fastening force to press the pair of side wall portions against each other in an approaching direction, a bolt operational portion operative to change the fastening force by rotationally operating the bolt, and a biasing member arranged between each of the pair of side wall portions and the support-side column and operative to apply a pressing force to the support-side column from the both sides, in the vehicle width direction, thereof when the pair of side wall portions receive the fastening force,
said biasing member comprises at least a pair of upper-side pressing portions provided to press a portion of said support-side column which is above an axial center of the support-side column from the both sides, in the vehicle width direction, thereof and at least a pair of lower-side pressing portions provided to press another portion of the support-side column which is below the axial center of the support-side column from the both sides, in the vehicle width direction, thereof, and
the steering device further comprises a pair of pressing plates arranged on respective outward sides, in the vehicle width direction, of said pair of side wall portions and operative to press the pair of side wall portions to respective inward sides, in the vehicle width direction, thereof when receiving the fastening force of said bolt, wherein said pair of pressing plates have respective convex portions which protrude toward said side wall portions at respective positions which face said pair of upper-side pressing portions and said pair of lower-side pressing portions, interposing the side wall portions therebetween.

2. The steering device of claim 1, wherein said bolt operational portion is a lever operative to change the fastening force of said bolt inserted into the tilting long holes, said lever comprises a root-side end portion connected to the bolt and an operational-side end portion positioned on a vehicle rearward side of the bolt and operative to receive an operational force from outside, and said pair of upper-side pressing portions and said pair of lower-side pressing portions are arranged on the vehicle rearward side of said tilting long holes at least.

3. The steering device of claim 2, wherein said pair of upper-side pressing portions and said pair of lower-side pressing portions are arranged on forward-and-rearward both sides, in the vehicle longitudinal direction, of said tilting long holes, respectively.

4. The steering device of claim 1, wherein said support bracket further comprises a support-bracket connection portion to interconnect said pair of side wall portions, and said support-bracket connection portion has a bending deformation portion operative to be bending-deformed in a direction where the pair of side wall portions approach each other when the pair of side wall portions receive the fastening force of said bolt.

5. The steering device of claim 2, wherein said support bracket further comprises a support-bracket connection portion to interconnect said pair of side wall portions, and said support-bracket connection portion has a bending deformation portion operative to be bending-deformed in a direction where the pair of side wall portions approach each other when the pair of side wall portions receive the fastening force of said bolt.

6. The steering device of claim 3, wherein said support bracket further comprises a support-bracket connection portion to interconnect said pair of side wall portions, and said support-bracket connection portion has a bending deformation portion operative to be bending-deformed in a direction where the pair of side wall portions approach each other when the pair of side wall portions receive the fastening force of said bolt.

7. The steering device of claim 1, wherein said biasing member further has a pair of support portions extending in the vehicle longitudinal direction and supporting said pair of upper-side pressing portions and said pair of lower-side pressing portions, respectively, and a biasing-member connection portion to interconnect vehicle-forward-side end portions of said pair of support portions, and said pair of support portions are configured to be bending-deformed toward an inward side, in the vehicle width direction, thereof when the pair of upper-side pressing portions and the pair of lower-side pressing portions receive the fastening force of said bolt.

8. The steering device of claim 2, wherein said biasing member further has a pair of support portions extending in the vehicle longitudinal direction and supporting said pair of upper-side pressing portions and said pair of lower-side pressing portions, respectively, and a biasing-member connection portion to interconnect vehicle-forward-side end portions of said pair of support portions, and said pair of support portions are configured to be bending-deformed toward an inward side, in the vehicle width direction, thereof when the pair of upper-side pressing portions and the pair of lower-side pressing portions receive the fastening force of said bolt.

9. The steering device of claim 3, wherein said biasing member further has a pair of support portions extending in the vehicle longitudinal direction and supporting said pair of upper-side pressing portions and said pair of lower-side pressing portions, respectively, and a biasing-member connection portion to interconnect vehicle-forward-side end portions of said pair of support portions, and said pair of support portions are configured to be bending-deformed toward an inward side, in the vehicle width direction, thereof when the pair of upper-side pressing portions and the pair of lower-side pressing portions receive the fastening force of said bolt.

* * * * *